United States Patent
Benoit et al.

(10) Patent No.: US 7,991,953 B2
(45) Date of Patent: Aug. 2, 2011

(54) METHOD OF VERIFYING PSEUDO-CODE LOADED IN AN EMBEDDED SYSTEM, IN PARTICULAR A SMART CARD

(75) Inventors: Alexandre Benoit, Marseilles (FR); Laurent Gauteron, Marignane (FR)

(73) Assignee: Gemalto SA, Meudon (FR)

( * ) Notice: Subject to any disclaimer, the term of this patent is extended or adjusted under 35 U.S.C. 154(b) by 953 days.

(21) Appl. No.: 11/918,973

(22) PCT Filed: Mar. 14, 2006

(86) PCT No.: PCT/EP2006/060676
§ 371 (c)(1),
(2), (4) Date: Oct. 22, 2007

(87) PCT Pub. No.: WO2006/111441
PCT Pub. Date: Oct. 26, 2006

(65) Prior Publication Data
US 2009/0049258 A1    Feb. 19, 2009

(30) Foreign Application Priority Data
Apr. 22, 2005   (FR) ..................... 05 51036

(51) Int. Cl.
*G06F 12/00*   (2006.01)
(52) U.S. Cl. ............... 711/115; 711/1; 711/6; 711/100; 711/104; 711/105; 711/161; 711/162; 703/22; 703/23; 703/26; 713/1; 713/2; 717/124; 717/126; 717/127; 717/131; 235/492
(58) Field of Classification Search ............ 711/6, 156, 711/203; 703/22, 23, 26, 194; 717/124, 717/126, 127, 131; 235/492; 713/1–2
See application file for complete search history.

(56) References Cited

U.S. PATENT DOCUMENTS
6,640,279 B2 *  10/2003  Levy et al. ............... 711/6
(Continued)

FOREIGN PATENT DOCUMENTS
FR   2 797 963 A    3/2001
FR   2 797 963 A1   3/2001
FR   2 840 084 A    11/2003

OTHER PUBLICATIONS
International Search Report (Form PCT/ISA/210) issued in corres. International Patent Application No. PCT/EP2006/060676, Oct. 30, 2007, EPO, Rijswijk, NL; and English translation thereof.
(Continued)

*Primary Examiner* — Tuan V Thai
*Assistant Examiner* — Zhuo H Li
(74) *Attorney, Agent, or Firm* — Buchanan Ingersoll & Rooney PC

(57) ABSTRACT

The invention relates to a verification of applications in interpreted language of the byte-code type (pseudo-code) loaded on portable electronic devices, in particular a chipcard and a method for verification of an application (31) interpreted by a virtual machine (42), said application being loaded on a portable electronic device (1), comprising at least one processor (2) and one RAM (5). The method comprises carrying out the following after loading said application in the device and before validation thereof, checks in the code of said application by means of a process carried out by the processor (2), characterized in comprising, on starting a sub-program, a step of backing up the actual verification context (200 to 203) in the RAM (5), a step for creation and activation of a new verification context (206 to 209) for the sub-program and a step for restoration of the verification context (200 to 203) previously backed-up.

15 Claims, 4 Drawing Sheets

U.S. PATENT DOCUMENTS

| | | | |
|---|---|---|---|
| 7,120,572 B1* | 10/2006 | Liang | 703/26 |
| 2004/0153709 A1* | 8/2004 | Burton-Krahn | 714/4 |
| 2005/0252977 A1* | 11/2005 | Grezes et al. | 235/492 |
| 2005/0277432 A1* | 12/2005 | Viana et al. | 455/466 |

OTHER PUBLICATIONS

English translation of Written Opinion of the International Searching Authority issued in corres. International Patent Application No. PCT/EP2006/060676.

Leroy, Xavier, "Java Bytecode Verification: Algorithms and Formalizations," *Journal of Automated Reasoning*, 2003, vol. 30, No. 3-4, Kluwer Academic Publishers, NL.

French Search Report dated Nov. 11, 2005.

A. Coglio: "Simple Verification Technique for Complex Java Bytecode Subroutines" Concurrency and Computation Practice & Experience, vol. 16, No. 7, Jun. 7, 2004, pp. 647-670, XP002353719.

* cited by examiner

METHOD OF VERIFYING PSEUDO-CODE LOADED IN AN EMBEDDED SYSTEM, IN PARTICULAR A SMART CARD

BACKGROUND OF THE INVENTION

The present invention relates to a method of verifying consistency of codes for an embedded system.

The invention relates more particularly, but not exclusively, to the field of applications in interpreted language of the bytecode (pseudo-code) type that are loaded in a smart card.

The term "embedded system" is used below in the broad sense, in particular to designate a system designed for any portable electronic device, e.g. a smart card (chip card) whose processing and storage resources are relatively limited.

Similarly, an "interpreted language" is a non-compiled language in which execution of the lines of code requires the presence of auxiliary means making it possible to interpret the code. An example of such a language is the Java (Registered Trademark) language that is in very widespread use in application solutions for smart cards. The Java application or "applet" is interpreted by an associated Java Virtual Machine (JVM). Hardware solutions also exist, e.g. a dedicated chip, that implement the equivalent of the virtual machine. The term "virtual machine" is used below to designate both auxiliary means of the software type and also auxiliary means of the hardware type that make it possible to interpret an associated interpreted language.

Verification of pseudo-code (bytecode), for example and non-exclusively Java (Registered Trademark), is a key element in the security of Java (Registered Trademark) platforms. Such verification consists, in particular, in ensuring that a bytecode program is unadulterated (integrity verification) and that it complies with properties, e.g. the typing of the variables of the code, said bytecode program being interpreted by a virtual machine, i.e. by a machine having a stack (memory with stacking and unstacking access) and having registers (memory registers with indexed access). These verification operations are relatively complex and resource-consuming (high consumption of Random Access Memory (RAM) and of processing time).

With the development of smart cards, Java (Registered Trademark) solutions have been integrated into such smart cards. During the life of the smart card, new applications, e.g. Java (Registered Trademark) applets, are loaded into the card in order to be used. Such applets can be corrupted or adulterated and can make calls to unauthorized memory zones, thereby generating malfunctions on the virtual machine. With the appearance of smart cards and with the integration of programs into such cards, such verification has become extremely complicated in all embedded systems, in view of the lack of available resources.

It is frequent for programs of the bytecode type to implement calls to other programs or to subprograms. A distinction can be made between calls to programs sharing the same execution context as the calling program and calls to programs of other methods having a specific dedicated execution context. The invention concerns more particularly calls to programs or subprograms that have the same execution context as the calling program. The term "subprogram" is used below to define the portions of code that can be reached from other portions of code sharing the same execution context, regardless of whether the portions are called programs or called subprograms (set of lines of code in common with the calling program). Such calls can be implemented in functions of the "Goto" or "If" types, or during calls to macros.

It should be noted, by way of example, in Java (Registered Trademark) language, that a pair instructions exist, namely Jump to Subroutine (JSR) and Return from Subroutine (RET), that implement subroutines or subprograms. FIG. 1 proposes an example of a code having a subprogram (B7 to RET) with a call to said subprogram (line 4: JSR B7). When, at the end of the subprogram, a RET instruction is executed, the virtual machine executes the bytecode following the JSR that called the subprogram. In order to store the information of the calling JSR, its address is recorded on the stack of the virtual machine, but without any instance of typing of the information: it is a numerical value in the stack that depends on the execution flow. The problem of such recording lies in the fact that the standard verifiers work on the basis of the typings and do not have access to the numerical values proper. It is thus not possible to determine statically which code portions are calling the subprogram.

Such verification algorithms apply the unification algorithm for each bytecode, the principle of which algorithm is as follows: in a bytecode, at a point of convergence at which the same variable converges with two different typings (coming from two different jumps to subprograms, for example), the variable takes the typing of the first ancestor common to the two typings (the concept of common ancestor results from the principles of inheritance of the object-oriented language of the Java (Registered Trademark) type). And in the event of typing incompatibility, a type called "TOP" is assigned to the variable. Then, during modeling of the bytecode, if the typing expected by the bytecode is not compatible with the bytecode received, the code is rejected.

With subprograms, two different calls to the same subprogram can be implemented even though a variable does not have the same typing. Thus, it is possible for a verification error (incompatible typings) to occur even though there is no typing problem (since there are two different contexts, the two typings cannot interfere during execution of the code by the virtual machine).

For Java (Registered Trademark) cards, the pseudo-code verification ensures that no illegal manipulation is performed on the typing of the elements used by the bytecode. Two properties are to be verified:

for each bytecode, the height of the stack is always the same regardless of the execution path;

for each bytecode, there exists a typing of the variables (registers) and of the stack stages that is compatible with the bytecode regardless of the execution path.

For this purpose, all of the possible execution paths are explored statically. This is an abstract execution of the bytecode.

For each line of bytecode, the integrity verification requires a lot of information to be stored. It has been shown that it suffices to effect this storage only for the targets of jumps. In addition, the algorithm needs to store additional information such as the instruction pointer or "program counter" (pointer on the line of code at the current verification point), the worklist (list of lines of codes to be verified subsequently) and the current frame (set of typings of the registers and of the stack at the point that is being examined, recorded in the RAM of the device).

External verification solutions are known—such as the SUN MICROSYSTEMS (Registered Trademark) solution—in which the bytecode is initially verified during off-card processing. Once it has been validated, it is loaded onto the smart card. The drawback with such solutions lies in the fact that, between the verification of the bytecode and the loading into the card, a possibility of adulterating the code exists.

Those solutions thus do not guarantee integrity between the initial code and the final code loaded onto the card and then executed.

The SUN MICROSYSTEMS (Registered Trademark) verifier is also known, in which the verification is performed off-card in a secure environment and which makes it possible to sign the program. The card merely has to verify the signature on receiving the program.

Having that solution carried by the card suffers from drawbacks, in particular RAM consumption that is too high.

Verification with a proof carrying code is also known. A proof carrying code is computed off-card, and is then added to the program when the program is transmitted to the card. The idea is to insert typing information into the code. As a result, verification on the card is greatly facilitated and requires only a very small amount of RAM.

The drawback with that solution lies in the need for off-card pre-processing: computing the proof; and in the larger size of the data (bytecode and proofs) to be transmitted and stored: longer transmission time, and increased consumption of passband.

The Trusted Logic (Registered Trademark) verifier is also known that is protected by Patent FR 2 815 434. The registers used by the virtual machine are split up monomorphically, i.e. each register has a single variable typing. The RAM needs are thus reduced. The drawback of that solution is that it is necessary to perform computation off-card in order to modify the methods so that they verify the two additional properties required.

The literature tends to indicate that certain embedded bytecode verifications are infeasible. In particular, the publication "Java bytecode verification: algorithms and formalisations" (http://pauillac.inria.fr/~xleroy/publi/bytecode-verification-JAR.pdf) specifies that polyvariant conventional verification algorithms cannot be implemented on equipment having low processing capacities such as Java (Registered Trademark) cards.

SUMMARY OF THE INVENTION

An object of the present invention is to remedy the drawbacks of the prior art by proposing a method of verifying the consistency of codes for an embedded system that limits the RAM consumed during the processing. The invention also does not require any pre-processing outside the portable electronic device, e.g. the smart card, or any adding of elements to the code of the application. Another object of the invention is to optimize this management of the RAM during the verification stage.

The invention performs verification of bytecode by context (polyvariant) with particular management of the current frames in order to consume less RAM. Provision is made so that a situation of method verification is reached during a subprogram verification. For this purpose, a context change is made, by backing up the state of the current data (comprising, in particular, the stack frame at the jump targets, the current frame, and the worklist). At the exit of the subprogram, the current frame of the current context of the subprogram is unified with the frame corresponding to the successor of the calling bytecode (e.g. JSR) of the preceding context, then the preceding context is restored. The aim of this is to be able to manage the calls to subprograms, e.g. JSRs/RETs, it being possible for them to be interleaved.

The invention also optimizes memory consumption during backup of the frames at the jump targets by establishing, over time, a dictionary of stack frames (e.g. the current frames at the jump targets stored on changing context) to which the backups point. In conventional use, a large number of additional and sometimes redundant items of information must be stored in order to manage these calls to jumps. Such a mass of information is not compatible with the size of available memory in most portable electronic devices. The advantage of the dictionary is not to increase unnecessarily the number of identical stack frames backed up in the memory and thus makes it possible to obtain a good compression ratio due to the properties of the bytecodes and of the compilers. The advantage of the dictionary is to enable the consumed memory to fit into portable electronic devices having limited resources, and, for objects having large RAM resources, to enable a portable electronic object having smaller RAM resources to be used, and thus to achieve cost-saving.

The invention is easy to incorporate into existing solutions in order to improve the performance thereof by suitable management of RAM.

To these ends, the invention, in its most general acceptation, provides a verification method for verifying an application interpretable by a virtual machine, said application being loaded into a portable electronic device comprising at least a processor and a random access memory or "RAM", the method consisting in acting, once said application has been loaded into the device and prior to it being validated, to perform checks on the code of said application by processing implemented by the processor, said method being characterized in that it comprises:

during a call to a subprogram, a backup step for backing up the current verification context in the RAM;

a creation and activation step for creating and activating a new verification context dedicated to the subprogram; and at the end of the subprogram, a restoration step for restoring the previously backed-up verification context.

In an implementation, during said creation and activation step, the new verification context is initialized, e.g. with the current frame only.

In a particular implementation, the method further comprises immediate execution of checks on the code of the called subprogram when the call to said subprogram has been detected.

More particularly, the method does not include a prior step for demarcating the code.

In an implementation, the method does not include use of resources external to said device except for an electrical power supply.

In an implementation, the context comprises a worklist making it possible to go through the tree structure of the application code. The method further comprises, during the checking of a line of code of the application, an update step for updating said worklist with the possible successors of said line of code.

Particularly, the context comprises an instruction pointer and a current frame.

In an implementation, all or some of the identical frames are backed up under a single address in a zone of the RAM that is called a dictionary.

In a particular implementation, the identical frames are backed up under a single address and a dictionary containing the frames to be backed up is created.

More precisely, for each new frame to be backed up in the RAM, it is verified whether all or some of the new frame is present in the dictionary, and if it is, the associated pointer (prt1) is used, and otherwise, it is recorded in the dictionary and the pointer (ptr2) associated with the new recording is used.

In an implementation, the dictionary is decomposed into sections corresponding to homogeneous portions of the frames. Particularly, one of the homogeneous portions of the dictionary corresponds to the registers. In a variant, one of the homogeneous portions of the dictionary corresponds to the stack. In another variant, one of the homogeneous portions of the dictionary corresponds to registers that are not variable in bytecode type.

The invention also provides a smart card and a Java card comprising at least a Java virtual machine and a Java applet in interpretable Java language whose consistency must be verified, for implementing this verification method.

BRIEF DESCRIPTION OF THE DRAWINGS

The invention can be better understood on reading the following description of an implementation of the invention, given merely by way of explanation and with reference to the accompanying drawings, in which.

DETAILED DESCRIPTION

In the implementations given below by way of example, the Java (Registered Trademark) subroutines called by JSR instructions are merely one example of subprograms that can be called generally and to which the invention relates.

Figure 2:
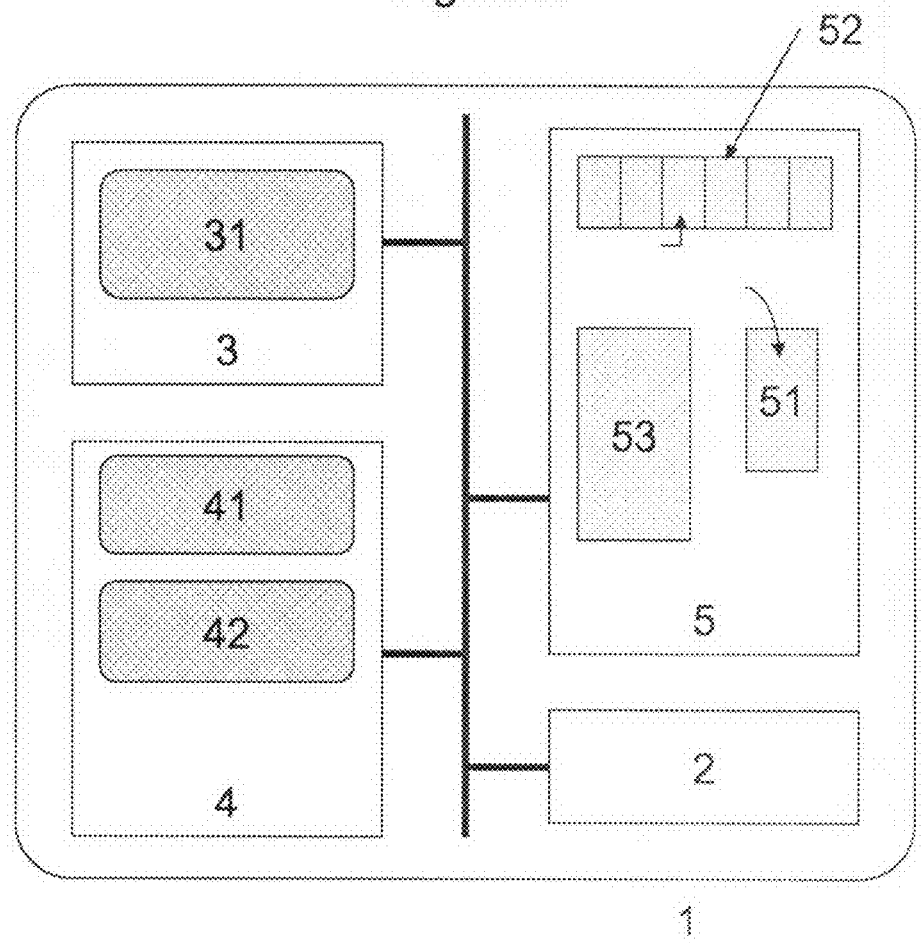
FIG. 2 shows an example of Java (Registered Trademark) card architecture for implementing the present invention.

With reference to FIG. 2, the card module 1 comprises a microprocessor 2 controlling a non-volatile memory 3, e.g. of the flash type, a read-only memory (ROM) 4, and a random-access memory (RAM) 5.

The ROM 4 stores the bytecode verifier computer programs 41 and the virtual machine 42 making it possible to execute the bytecode. The term "virtual machine" is used to mean a machine which, during execution of bytecodes, manages a stack 51 and registers 52 in RAM 5. The stack 51 is a top-access memory in which data is stacked and from which data is unstacked. The registers 52 are memory registers having indexed access or free access: any information in the registers can be accessed.

A program or application 31 to be verified is stored in the form of a file in the non-volatile memory 2. This program is in the form of pseudo-code or bytecodes, and the invention proposes to verify the integrity thereof relative to the virtual machine 42.

The file 31 is a converted applet (CAP) file which is the file loaded by the virtual machine 42. This file can contain a plurality of methods in the Java (Registered Trademark) sense, in which case, the verification of the bytecode takes place method-by-method. If a method M2 is invoked in the method M1, where M1 is being verified, the verifier considers M2 to be already verified or to be verified later, and goes on to the next bytecode.

Figure 1:
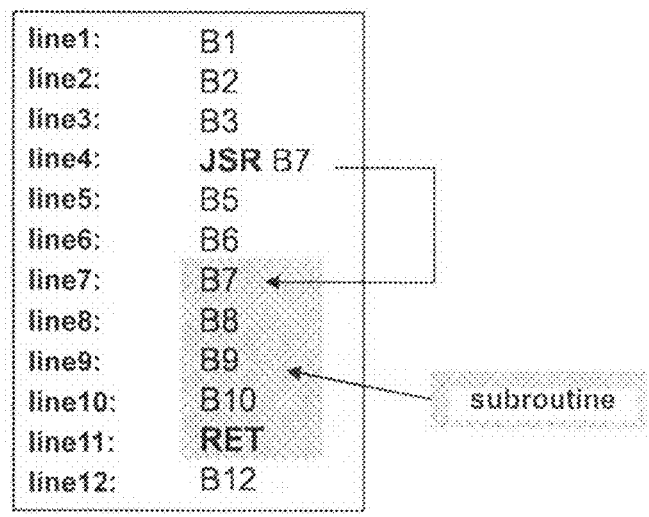
FIG. 1 shows an example of bytecodes including a subprogram.

FIG. 1 shows an example of a bytecode of a method M. This bytecode includes a jump-to-subroutine (JSR) in line 4 and a return (RET) in line 11. The subroutine called by the JSR extends from B7 to RET.

Figure 3:
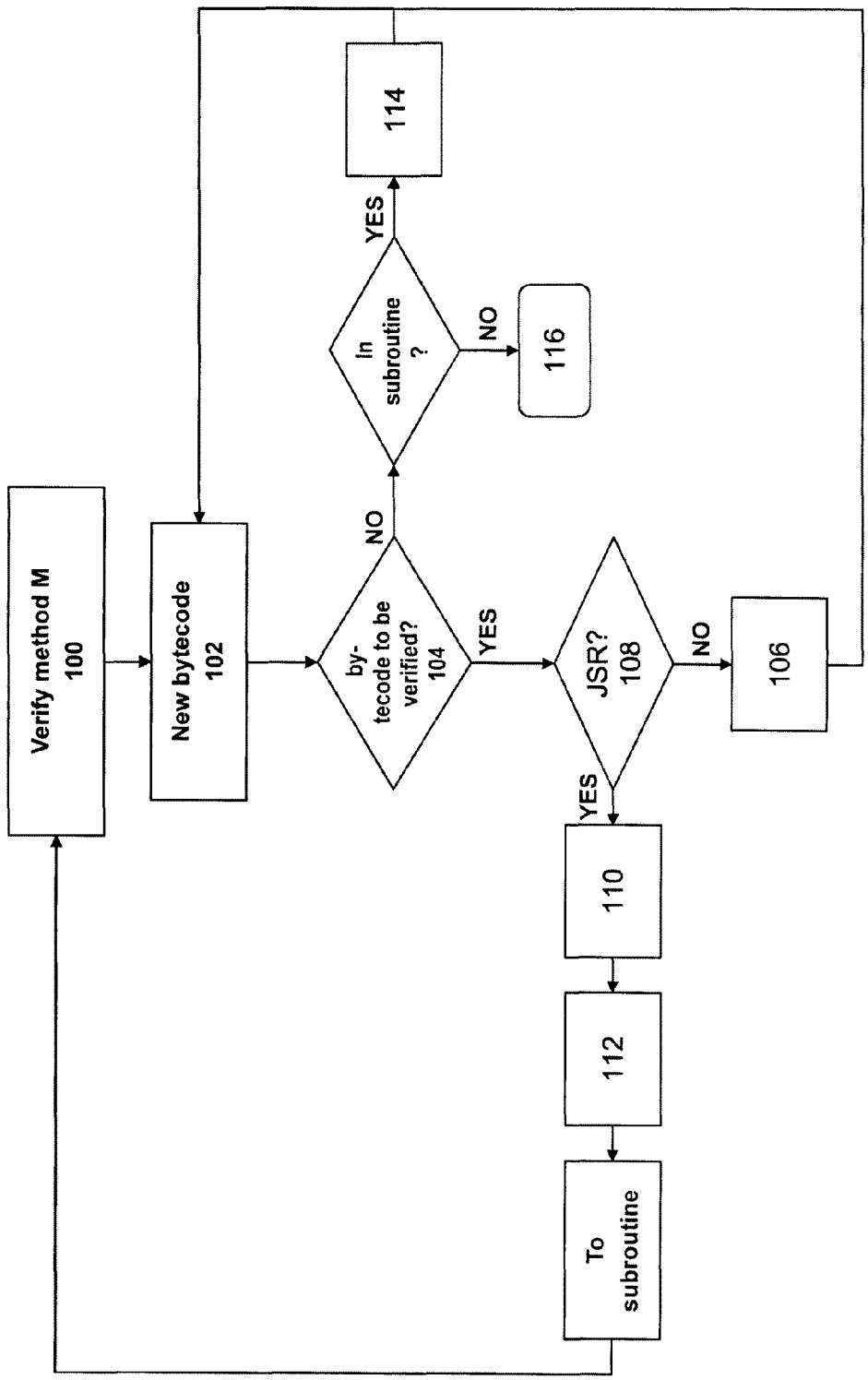
FIG. 3 shows the verification method of the present invention.
Figure 4:
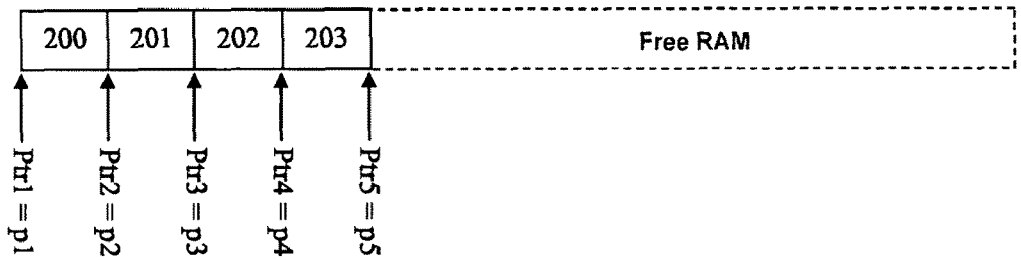
FIGS. 4 to 7 show how the RAM changes during implementation of the verification method of the invention.

With reference to FIG. 3, the bytecode verifier starts 100 the verification of the method M. The first bytecode B1 is taken 102. Since it is a conventional bytecode to be verified 104, verification of the integrity criteria (typing) is performed 106 on the bytecode by comparison with the registers and the stack of the current frame and said current frame is updated as a function of the bytecode (change of typing, new variable, etc.). The current frame is the set of the typings of the registers and of the stack of the virtual machine at the point that is being examined. Since it is the first bytecode, the current frame data 200 can be recorded in the memory as shown in FIG. 4. Additional data, e.g. the worklist 202, is also backed up in the memory; the worklist comprises the list of the next bytecode(s) to be verified and said list is put to "line 2" so as to indicate that the next bytecode to be processed is the bytecode of line 2. The worklist makes it possible to go through the tree-structure of the code and to cover all of the cases of this path by taking account the multiple successors that each line of code can have. The term "multiple successors" of a line of code is used to designate the other lines of code that can be reached from said line. The set of the items of data of the current frame and of the additional items of data (e.g. the worklist 202, the dictionary 203, and the list 201 of the stack frames at the jump targets) constitute the current context.

Then, the verification operation is reproduced for the bytecodes B2 and B3 with the context data in the RAM being updated, and, in particular, the worklist goes successively to "line 3" and then to "line 4".

Figure 5:
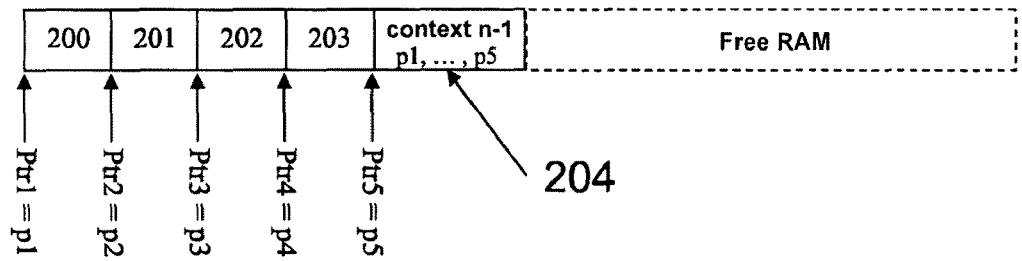

When the verifier encounters 108 the JSR at line 4, the worklist is updated at "line 5". Then the address of the JSR or instruction pointer, i.e. "line 4" is stored on the stack of the frame; it is this address that makes it possible to "store" the location from which the jump took place. The verifier then backs up 110 the current context in the RAM 5. FIG. 5 shows an implementation of the backup of the context: inter alia, the following are stored in the memory 204: the pointer p1 of the current frame, the pointers p2 to p4 of the additional data (worklist, etc.) and the end-of-context pointer p5. The term "stack frame" or "frame" corresponds to the current frame at the jump target, i.e. at the time at which said frame is backed up. The backed-up context is made up of the set of the items of data and structure 204 of RAM data items useful in verifying a method: worklist 202, stack frame 200, in particular.

Figure 6:
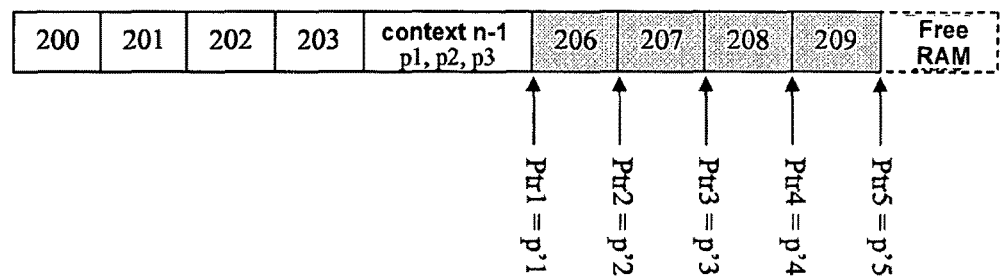

A new verification context is then created and activated 112. Shown by FIG. 6, a new frame 206 and additional items of data 207 to 209 are created in the free RAM with corresponding pointers p'1 to p'5. During this creation, the new current frame 206 is initialized identically to the current stack frame 200 at the time of the subroutine jump. At that instant, registers and a stack comply with the prior context, but in a new context.

The verification algorithm can then resume, the worklist being put to "line 7" at the start of the subroutine.

The verification algorithm then applies to the bytecodes B7, B8, and B9, the context data in the memory being updated.

When the verifier encounters the bytecode RET of line 10, unification is established with the successor of the corresponding JSR, and the next element to be verified is looked for in the worklist of the current context. When the worklist is empty, the problem of demarcating the subroutines that is omnipresent in bytecode verification solutions is, in this example, naturally dealt with by the general verification algorithm: the worklist of the new context is empty, indicating the end of the subroutine.

Figure 7:
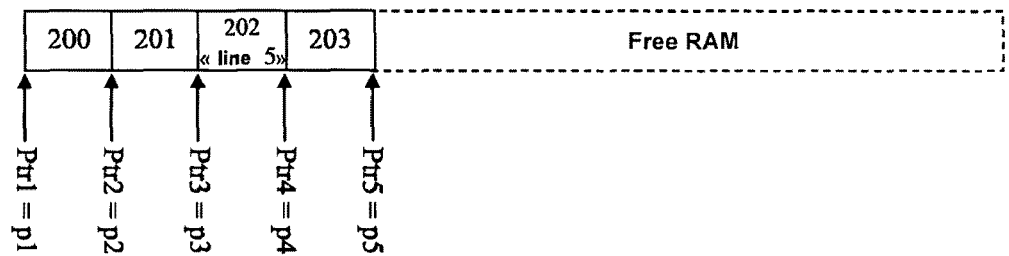

The subroutine is then ended and the preceding context is restored 114, as shown in FIG. 7.

Finally, when there is no longer any bytecode to be verified, the verification of the method M ends 116.

In the event that a method is invoked in the method M, verification of the parameters of the method is performed in order to ensure that the current typings are consistent with the typings of the called method. The verification of this method is performed independently of the method M as indicated above.

In an implementation of the invention, a dictionary of the stack frames is used. In many cases, the stack frames change slowly and many of them have the same contents.

Figure 8:
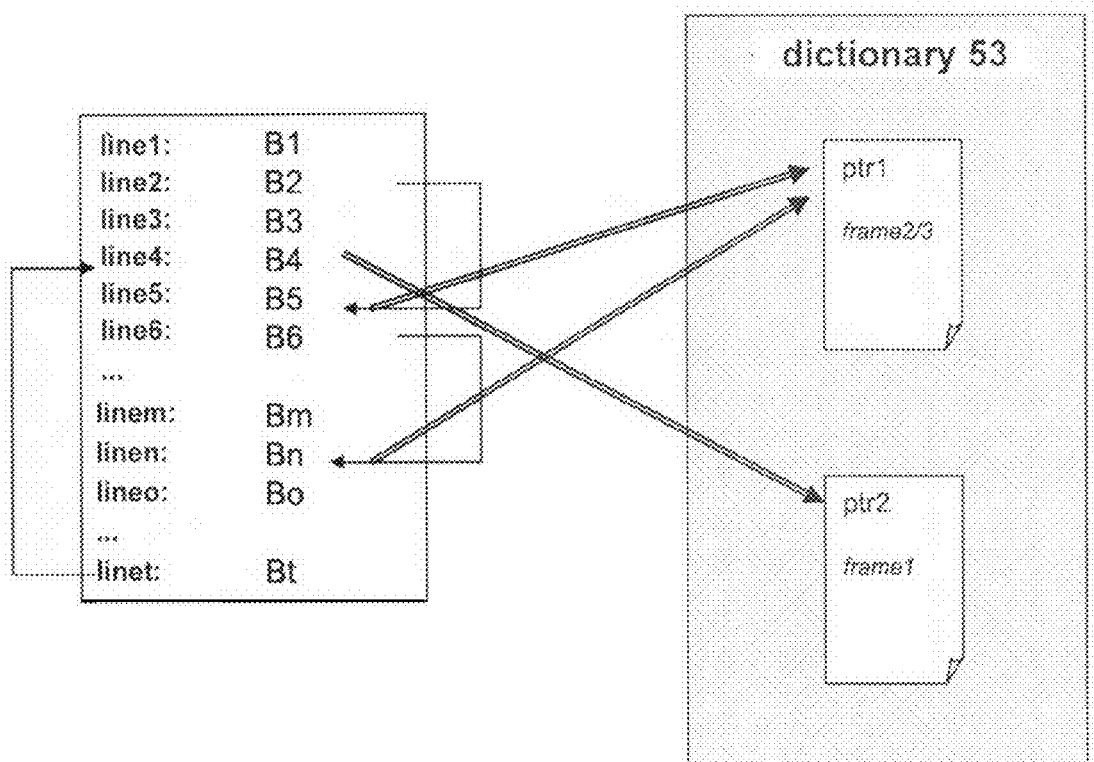
FIG. 8 shows the use of a dictionary for optimizing management of the RAM.

With reference to FIG. 8, the code includes three calls to subprograms.

During the call to a subprogram at B2, the current frame can be backed up in a portion of the RAM 5 that is called "the dictionary". In which case, the backup of the current context in the RAM 5 then uses the pointer ptr1 referring to the current frame.

During a following call to a subprogram at B6, for backing up the current context, use is made of the pointer ptr1 associated with the stack frame of the dictionary that is identical to the current frame at the time of the jump.

When such a stack frame is not present in the dictionary 53, a new entry ptr2 is created in the dictionary (case of subprogram call Bt).

In one implementation, the dictionary is emptied of unused stack frames (i.e. when the associated pointer is not used in any context backup) as the subprograms are taken out.

Optionally, the dictionary can be built with partial stack frame entries that are recurrent in order to optimize the compression and the amount of RAM space saved. By way of example, it is possible, in the dictionary, to separate the registers and the stack, or to separate the registers into sets, particularly the registers that are not variable in "bytecode type" (the overall variables declared at the beginning of the method of the Java source together with the parameters, and that do not change typing during the method) can constitute a set to which each context in the method points.

It is understood that the dictionary is not limited to the stack frames and it can contain any type of entries that are used during backup of the contexts, in order to minimize the size of said backups.

The invention claimed is:

1. A verification method for verifying an application interpretable by a virtual machine capable of managing several registers and a stack, said application being loaded into a portable electronic device comprising at least a processor and a random access memory or "RAM",
the method comprising, once said application has been loaded into the device and prior to it being validated, performing checks on the code of said application by operations implemented by the processor, said method including the following operations:
during a call to a subprogram, backing-up the current verification context in the RAM;
creating and activating a new verification context dedicated to the subprogram; and
at the end of the subprogram, restoring the previously backed-up verification context,
wherein a verification context comprises an instruction pointer and a current frame, the current frame comprising a set of typings of registers and of the stack at the point that is being examined.

2. A verification method according to claim 1, wherein, during said creation and activation step, the new verification context is initialized.

3. A verification method according to claim 1, further comprising immediate execution of checks on the code of the called subprogram when the call to said subprogram has been detected.

4. A verification method according to claim 1, wherein the method does not include a prior step for demarcating the code.

5. A verification method according to claim 1, wherein the method does not include use of resources external to said device except for an electrical power supply.

6. A verification method according to claim 1, wherein the context comprises a worklist making it possible to go through a tree structure of the application code.

7. A verification method according to claim 6, further comprising, during the checking of a line of code of the application, an update step for updating said worklist with the possible successors of said line of code.

8. A method according to claim 1, wherein all or some identical frames are backed up under a single address in a zone of the RAM that is called a dictionary.

9. A method according to claim 8, wherein for each new frame to be backed up in the RAM, a verification is made whether all or some of the new frame is present in the dictionary, and if it is, the associated pointer is used, and otherwise, the new frame is recorded in the dictionary and the pointer associated with the new recording is used.

10. A verification method according to claim 8, wherein the dictionary is decomposed into sections corresponding to homogeneous portions of the frames.

11. A verification method according to claim 10, wherein one of the homogeneous portions of the dictionary corresponds to registers in the RAM.

12. A verification method according to claim 10, wherein one of the homogeneous portions of the dictionary corresponds to a stack in the RAM.

13. A verification method according to claim 10, wherein one of the homogeneous portions of the dictionary corresponds to registers that are not variable in bytecode type.

14. A smart card comprising at least a RAM and a processor for implementing the method according to claim 1.

15. A Java card of the smart card type, comprising a RAM, a processor, a Java virtual machine and at least one Java applet for which the consistency of the code interpretable by the virtual machine must be verified, for implementing the method according to claim 1.

* * * * *